(12) United States Patent
Zhang et al.

(10) Patent No.: US 10,396,373 B2
(45) Date of Patent: Aug. 27, 2019

(54) PROTON EXCHANGE MEMBRANE FUEL CELL WITH A BELLOWS-SHAPED MEMBRANE ELECTRODE ASSEMBLY DEVICE

(71) Applicants: Tsinghua University, Beijing (CN); HON HAI PRECISION INDUSTRY CO., LTD., New Taipei (TW)

(72) Inventors: Li-Na Zhang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 335 days.

(21) Appl. No.: 15/444,176

(22) Filed: Feb. 27, 2017

(65) Prior Publication Data
US 2017/0288242 A1    Oct. 5, 2017

(30) Foreign Application Priority Data
Mar. 31, 2016 (CN) .......................... 2016 1 0197851

(51) Int. Cl.
| | |
|---|---|
| *H01M 8/04082* | (2016.01) |
| *H01M 4/92* | (2006.01) |
| *H01M 8/04223* | (2016.01) |
| *H01M 8/1039* | (2016.01) |
| *H01M 8/16* | (2006.01) |
| *H01M 8/1018* | (2016.01) |

(52) U.S. Cl.
CPC ....... *H01M 8/04201* (2013.01); *H01M 4/926* (2013.01); *H01M 8/04231* (2013.01); *H01M 8/1039* (2013.01); *H01M 8/16* (2013.01); *H01M 2008/1095* (2013.01); *Y02E 60/527* (2013.01)

(58) Field of Classification Search
CPC .... H01M 8/04201; H01M 8/16; H01M 4/926; H01M 8/04231; H01M 8/1039; H01M 2008/1095; Y02E 60/527
USPC .......................................................... 429/444
See application file for complete search history.

(56) References Cited

U.S. PATENT DOCUMENTS

| | | | | |
|---|---|---|---|---|
| 7,410,714 B1 * | 8/2008 | Burke | ............... | H01M 8/04007 429/418 |
| 2009/0324431 A1 * | 12/2009 | van Boeyen | ............ | F04B 19/24 417/379 |

* cited by examiner

*Primary Examiner* — Gary D Harris
(74) *Attorney, Agent, or Firm* — ScienBiziP, P.C.

(57) ABSTRACT

The disclosure relates to a proton exchange membrane fuel cell. The fuel cell includes: a container, wherein the container includes a reacting room, a fuel room connected to the reacting room through a fuel inputting hole, a fuel inputting door located on the fuel inputting hole, a waste collecting room connected to the reacting room through a waste outputting hole, a waste outputting door located on the waste outputting hole; a membrane electrode assembly located in the reacting room, wherein the membrane electrode assembly device defines a bellows and a pipe connected to the bellows and extending out of the reacting room, the reacting room is divided into a first electrode space outside the bellows and a second electrode space inside the bellows, the volume of the first electrode space and the second electrode space can be changed by deforming the bellows.

17 Claims, 7 Drawing Sheets

PROTON EXCHANGE MEMBRANE FUEL CELL WITH A BELLOWS-SHAPED MEMBRANE ELECTRODE ASSEMBLY DEVICE

CROSS-REFERENCE TO RELATED APPLICATIONS

This application claims all benefits accruing under 35 U.S.C. § 119 from China Patent Application No. 201610197851.9, filed on Mar. 31, 2016, in the China Intellectual Property Office, the contents of which are hereby incorporated by reference.

FIELD

The subject matter herein generally relates to fuel cell, and particularly, to a proton exchange membrane fuel cell.

BACKGROUND

Fuel cells can generally be classified into alkaline, solid oxide, and proton exchange membrane fuel cells. The proton exchange membrane fuel cell has received increasingly more attention and has developed rapidly in recent years.

Typically, the proton exchange membrane fuel cell includes a number of separated fuel cell work units. Each work unit includes a fuel cell membrane electrode assembly (MEA), flow field plates (FFP), current collector plates (CCP). However, the traditional proton exchange membrane fuel cell also need related support equipment, such as blowers, valves, and pipelines, to input and output the fuel and oxygen gas. Thus, the traditional proton exchange membrane fuel cell has complicated structure and relatively high cost.

What is needed, therefore, is to provide a proton exchange membrane fuel cell which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
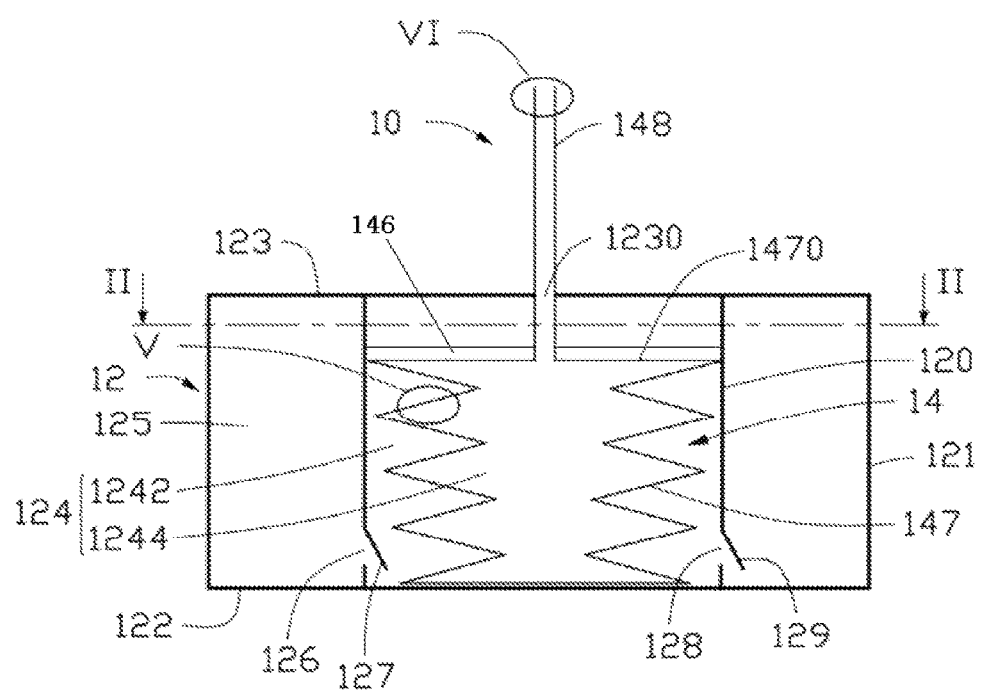
FIG. 1 is a schematic view of one embodiment of a fuel cell.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 2:
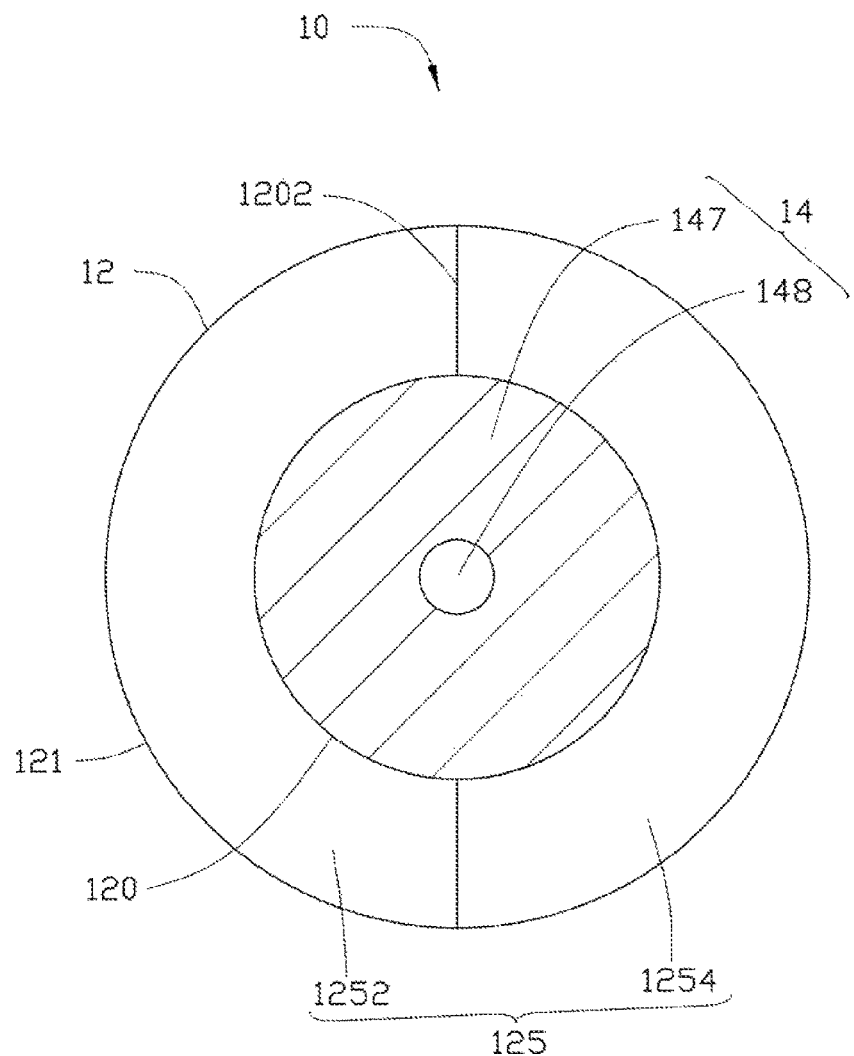
FIG. 2 is a schematic, cross-sectional view, along a line II-II of FIG. 1.

Referring to FIGS. 1 and 2, a proton exchange membrane fuel cell 10 of one embodiment is provided. The proton exchange membrane fuel cell 10 includes a container 12 and a membrane electrode assembly device 14 located in the container 12.

The container 12 includes an annular internal wall 120 and an annular external wall 121 surrounding the annular internal wall 120. The annular internal wall 120 and the annular external wall 121 are connected to each other by a bottom wall 122 and a top wall 123. A reacting room 124 is defined by the annular internal wall 120. A storage room 125 is defined between the annular internal wall 120 and the annular external wall 121. The storage room 125 is divided into a fuel room 1252 and a waste room 1254. The fuel room 1252 is in communication with the reacting room 124 through a fuel inputting hole 126, and the waste room 1254 is in communication with the reacting room 124 through a waste outputting hole 128. A fuel inputting door 127 is located on the fuel inputting hole 126, and a waste outputting door 129 is located on the waste outputting hole 128. A gas exchange hole 1230 is defined on the top wall 123 and used to communicate the reacting room 124 to the outside atmosphere. The shape and size of the gas exchange hole 1230 is not limited.

Figure 3:
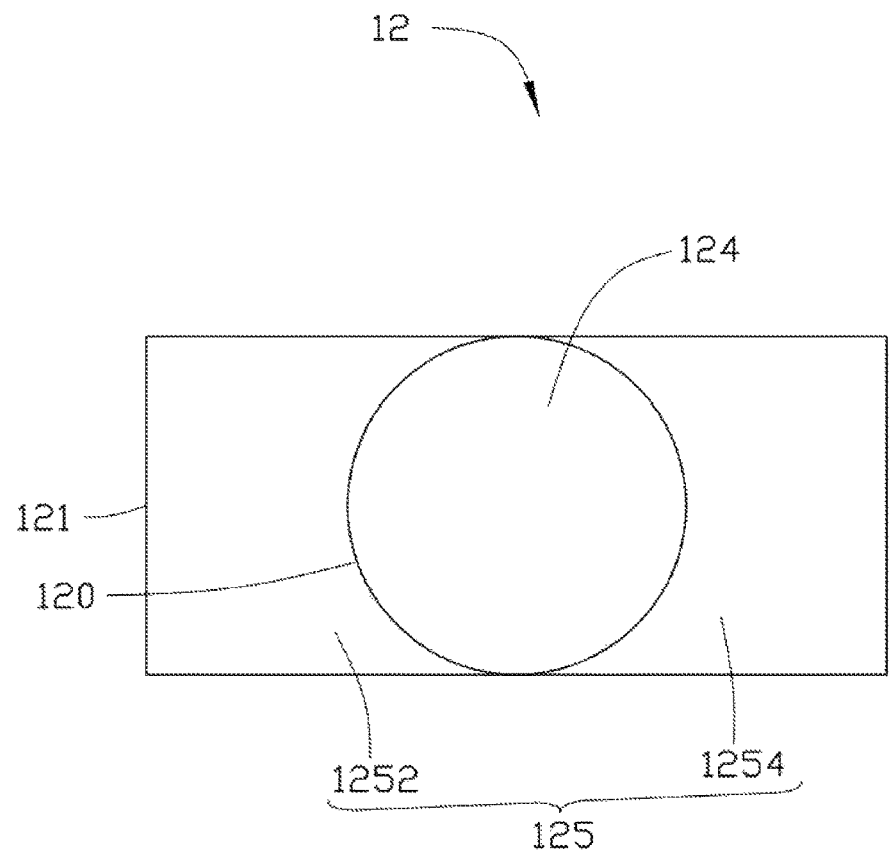
FIG. 3 is a schematic view of one embodiment of a container of a fuel cell.

The annular internal wall 120 and the annular external wall 121 can have a cross-section shape, such as round, ellipse, triangle, square, or any multilateral shape. The cross section shapes of the annular internal wall 120 and the annular external wall 121 can be the same as shown in FIG. 2 or different as shown in FIG. 3. Referring to FIG. 2, in one embodiment, the annular internal wall 120 and the annular external wall 121 can be substantially concentric cylinders spaced from each other. The space between the annular internal wall 120 and the annular external wall 121 is divided into the fuel room 1252, and the waste room 1254 by two plates 1202. Referring to FIG. 3, in one embodiment, the annular internal wall 120 and the annular external wall 121 can be tangent and in direct contact with each other at two places so that the space therebetween is divided into the fuel room 1252 and the waste room 1254.

The fuel inputting door 127 is fixed on the inner surface of the reacting room 124. The fuel inputting door 127 would be closed when the pressure of the reacting room 124 is higher than the pressure of the fuel room 1252, and the fuel inputting door 127 would be open when the reacting room 124 is lower than the pressure of the fuel room 1252. The waste outputting door 129 is fixed on the inner surface of the waste room 1254. The waste outputting door 129 would be open when the pressure of the reacting room 124 is higher than the pressure of the waste room 1254, and the waste outputting door 129 would be closed when the reacting room 124 is lower than the pressure of the waste room 1254. The shape and size of the container 12 is not limited as long as the container 12 can be divided into the reacting room 124, the fuel room 1252 and the waste room 1254. The container 12 can have a plurality of fuel rooms 1252 and a plurality of waste rooms 1254.

Figure 4:
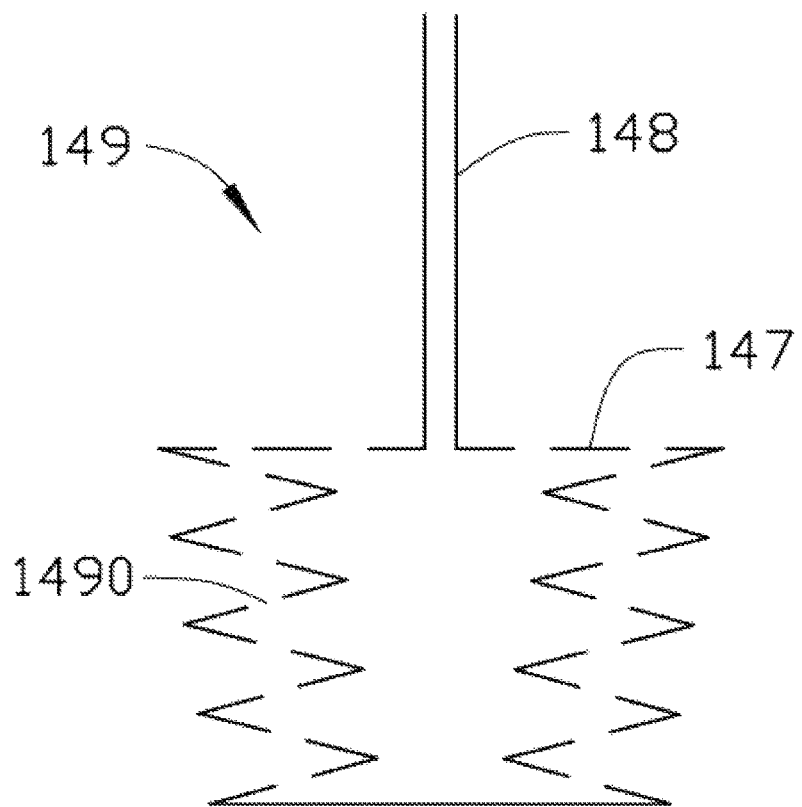
FIG. 4 is a schematic view of one embodiment of a hollow supporting structure of a fuel cell.
Figure 5:
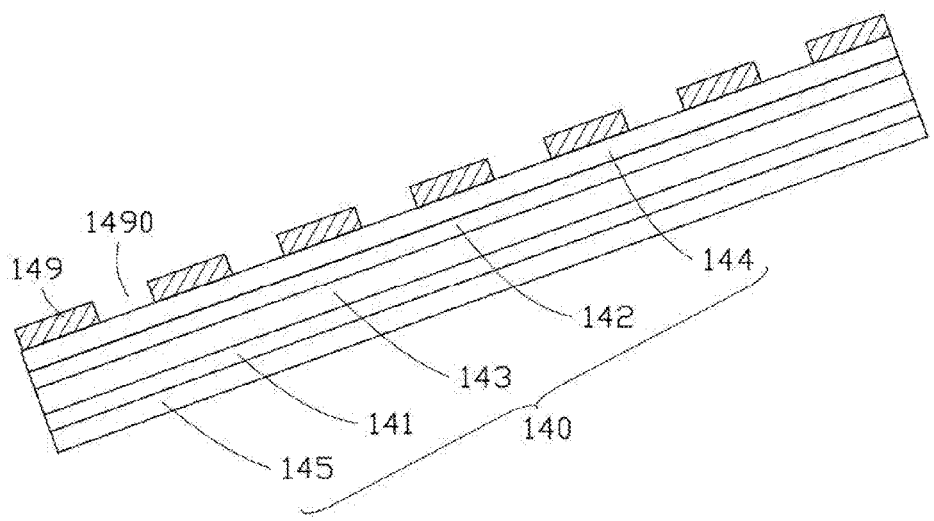
FIG. 5 is a schematic, enlarged view, of a part V of FIG. 1.
Figure 6:
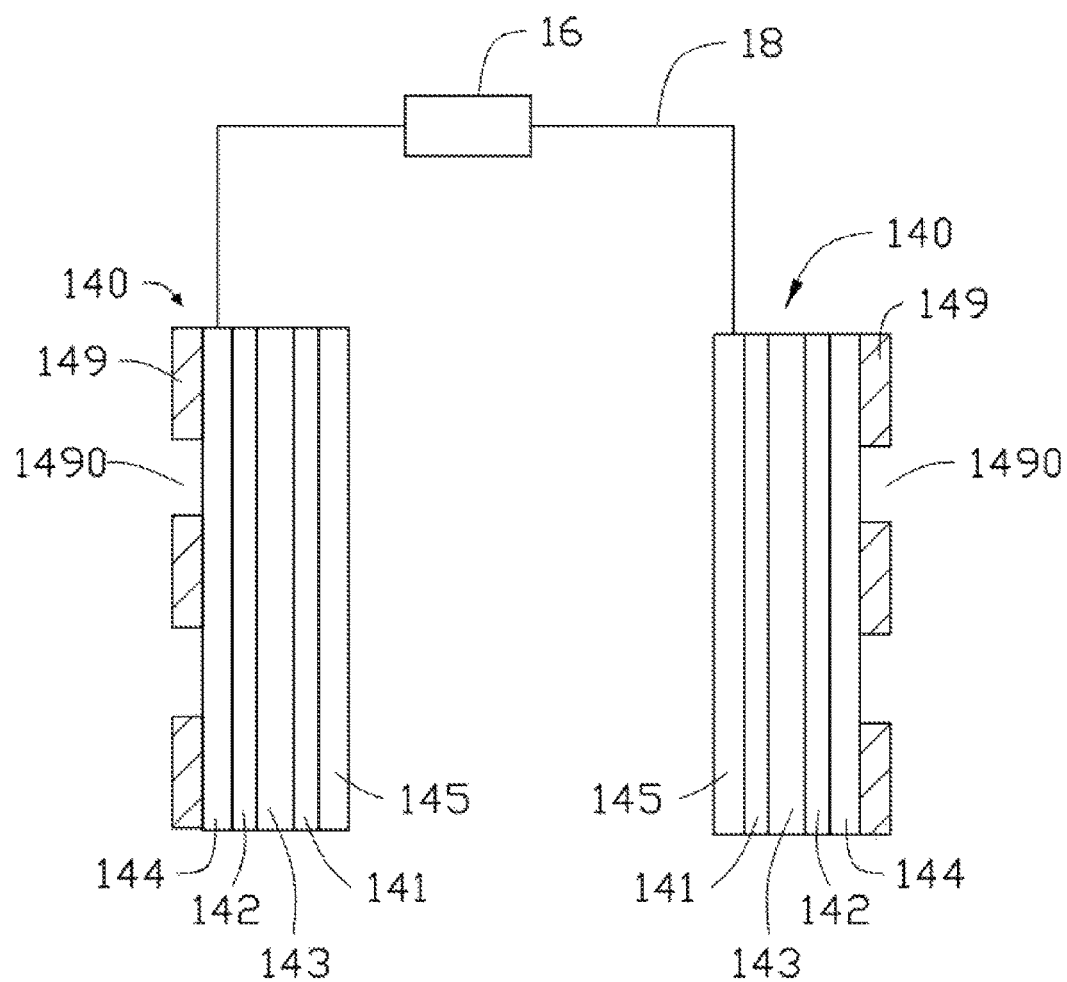
FIG. 6 is a schematic, enlarged view, of a part VI of FIG. 1.

Referring to FIGS. 4-6, the membrane electrode assembly device 14 includes a hollow supporting structure 149 and a membrane electrode assembly 140 located on the hollow supporting structure 149. The hollow supporting structure 149 defines a bellows 147 and a pipe 148 connected to the bellows 147 and extending out of the reacting room 124 through the gas exchange hole 1230. The bellows 147 can be reformed by compression or expansion. When the bellows 147 is compressed, the air in the bellows 147 would be exhausted. When the bellows 147 is expanded, the air outside of the bellows 147 will enter the bellows 147. The length of the pipe 148 can be greater than the distance between the bottom wall 122 and the top wall 123. A plurality of through holes 1490 is formed on the wall of the bellows 147. The plurality of through holes 1490 can also be formed on the wall of the pipe 148. The plurality of through holes 1490 is used to allow the fuel or oxygen gas to diffuse on the membrane electrode assembly 140. The membrane electrode assembly 140 is located on the hollow supporting structure 149 and covering the plurality of through holes 1490. The membrane electrode assembly 140 can be located on the inner surface of the hollow supporting structure 149 or the outer surface of the hollow supporting structure 149. The membrane electrode assembly 140 can be located only on the bellows 147, or on both the bellows 147 and the pipe 148.

The material of the hollow supporting structure 149 can be any material that is flexible and has a certain strength and bending resistance. The material of the hollow supporting structure 149 can be polymer, resin or metal. A cathode electrode space 1244 is defined in the bellows 147. An anode electrode space 1242 is defined between the annular internal wall 120 and the bellows 147, and also between the bellows top wall 1470 and the bottom wall 122. The anode electrode space 1242 and the cathode electrode space 1244 are changeable by compression or expansion of the bellows 147.

A gasket ring 146 can be used to seal the anode electrode space 1242. The gasket ring 146 includes an annular rubber body. The annular body and the reacting room 124 have the same cross section shapes and size. The cross section size of the bellows 147 is less than the cross-section size of the reacting room 124 so that the bellows 147 would have less abrasion and the fuel in the anode electrode space 1242 can be in contact with entire our surface of the bellows 147.

Alternatively, the bellows top wall 1470 and the reacting room 124 can have the same cross-section shapes and size so that the anode electrode space 1242 can be sealed by the bellows top wall 1470.

Referring to FIGS. 5-6, in one embodiment, the membrane electrode assembly 140 includes a proton exchange membrane 143, an anode electrode 142 and a cathode electrode 141. The proton exchange membrane 143 comprises a first surface and a second surface opposite to the first surface. The anode electrode 142 is located on the first surface and in the anode electrode space 1242, and the cathode electrode 141 is located on the second surface and in the cathode electrode space 1244. Alternatively, the membrane electrode assembly 140 can also include an anode current collector 144 located on the anode electrode 142 and a cathode current collector 145 located on the cathode electrode 141. When the material of the hollow supporting structure 149 is metal, the hollow supporting structure 149 can be used as the anode current collector 144 or the cathode current collector 145.

The material of the proton exchange membrane 143 can be perfluorosulfonic acid, polystyrene sulfonic acid, polystyrene trifluoroacetic acid, phenol formaldehyde resin acid, or hydrocarbons. In one embodiment, both the anode electrode 142 and the cathode electrode 141 includes a gas diffusion layer and catalyst layer located on the gas diffusion layer to form a double layer structure. In one embodiment, both the anode electrode 142 and the cathode electrode 141 includes a gas diffusion layer and catalyst material dispersed in the gas diffusion layer to form a single layer composite. The gas diffusion layer can be a carbon nanotube layer or a carbon fiber layer. The catalyst material of the cathode electrode 141 can be noble metal particles, such as platinum particles, gold particles or ruthenium particles. The catalyst material of the anode electrode 142 can be selected according to the fuel. When the fuel is biofuel, such as glucose, the catalyst material of the anode electrode 142 is biofuel catalyst, such as glucose oxidase. When the fuel is ether, the catalyst material of the anode electrode 142 is noble metal. The cathode current collector 145 and the anode current collector 144 are metal mesh or metal layer having through holes, and used to collect electrons or protons. Furthermore, the cathode current collector 145 and the anode current collector 144 can protect the entire membrane electrode assembly 140 during the membrane electrode assembly 140 moving.

In one embodiment, the proton exchange membrane 143 is a perfluorosulfonic acid film. The cathode electrode 141 includes a first carbon nanotube layer and platinum particles dispersed in the first carbon nanotube layer. The size of the platinum particles is in a range from about 1 nanometer to abut 10 nanometers. The distribution of the platinum particles is less than 0.5 mg/cm$^2$ (milligram per square centimeter). The anode electrode 142 includes a second carbon nanotube layer and enzymatic catalyst or microbe dispersed in the second carbon nanotube layer. The enzymatic catalyst can be oxidase or dehydrogenase. The enzymatic catalyst is dispersed on the surface of the carbon nanotubes of the carbon nanotube layer. The carbon nanotubes of the carbon nanotube structure include a plurality of carboxyls or hydroxyls. The enzymatic catalyst is attached to the surface of the carbon nanotubes via the carboxyls or hydroxyls thereof. Both the cathode current collector 145 and the anode current collector 144 are copper mesh.

Referring to FIG. 6, in working process of the proton exchange membrane fuel cell 10, the cathode current collector 145 and the anode current collector 144 are electrically connected to the load 16 via two wires 18. When the bellows 147 is expanded, the volumes of the anode electrode space 1242 and the cathode electrode space 1244 increase, and pressures of the anode electrode space 1242 and the cathode electrode space 1244 decrease. The fuel inputting door 127 would be open, and the outputting door 129 would be closed. The glucose biofuel enters the anode electrode space 1242 from the fuel room 1252. At the same time, the air outside of the bellows 147 would enter the bellows 147. When the bellows 147 is compressed, the volumes of the anode electrode space 1242 and the cathode electrode space 1244 decrease, and pressures of the anode electrode space 1242 and the cathode electrode space 1244 increase. The fuel inputting door 127 would be closed, and the outputting door 129 would be open. The waste biofuel enters the waste room 1254 from the anode electrode space 1242. At the same time, the waste gas inside of the bellows 147 would be exhausted through the pipe 148.

On the side of the anode electrode 142, the glucose biofuel is applied and decomposed by the enzymatic catalyst to form electrons and protons ($H^+$). The protons are transferred from the anode electrode 142 to the cathode electrode 141 by the proton exchange membrane 143. At the same time, the electrons arrive at the cathode electrode 141 by the external electrical circuit. On the side of the cathode electrode 141, oxygen is applied and reacts with the protons and electrons as shown in the following equation: $1/2O_2 + 2H+ + 2e \rightarrow H_2O$. In the process, a potential difference is generated, and a current flows through the load 16.

Because the fuel and oxygen gas are input and output by compression or expansion of the bellows 147, the proton exchange membrane fuel cell 10 does not need the support equipment, such as blowers, valves, and pipelines.

Figure 7:
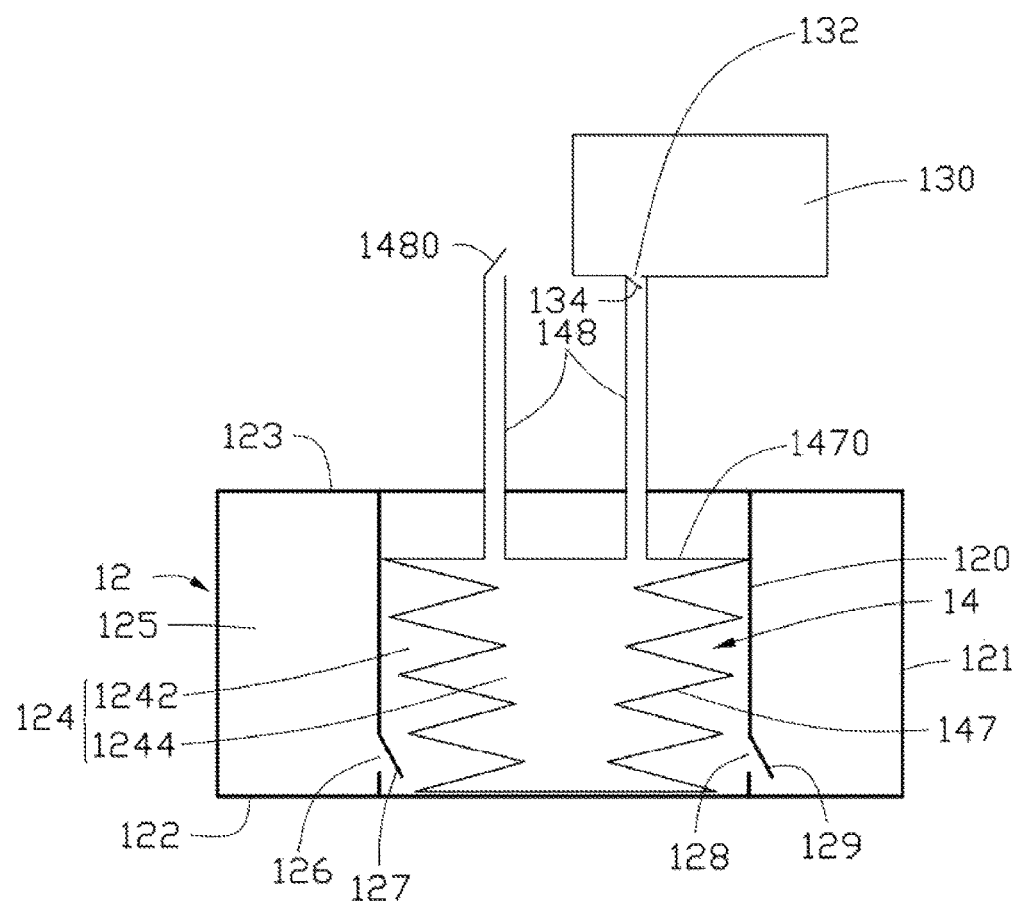
FIG. 7 is a schematic view of another embodiment of a fuel cell.

Referring to FIG. 7, a proton exchange membrane fuel cell 10A of another embodiment is provided. The proton exchange membrane fuel cell 10A includes the container 12 and the membrane electrode assembly device 14 located in the container 12.

The proton exchange membrane fuel cell 10A is similar to the proton exchange membrane fuel cell 10 above except that the proton exchange membrane fuel cell 10A further includes an oxygen room 130. The oxygen room 130 is in communication with the cathode electrode space 1244 through a first pipe 148a having one end connecting to a gas inputting hole 132, and a gas inputting door 134 is located on the gas inputting hole 132. The oxygen room 130 is above the cathode electrode space 1244.

The gas inputting door 134 would be closed when the pressure of the cathode electrode space 1244 is higher than the pressure of the oxygen room 130, and the gas inputting door 134 would be open when the pressure of the cathode electrode space 1244 is lower than the pressure of the oxygen room 130. A gas outputting door 1480 is located on the end of the second pipe 148b so that the second pipe 148b is only used to exhaust waste gas. The gas outputting door 1480 would be open when the pressure of the cathode electrode space 1244 is higher than the pressure of the atmosphere, and the gas outputting door 1480 would be closed when the pressure of the cathode electrode space 1244 is lower than the pressure of the atmosphere. When no waste gas would be resulted by the reaction in the cathode electrode space 1244, the second pipe 148b can be optional. The fuel in the fuel room 1252 can be ethanol gas or hydrogen gas. The catalysts of the anode electrode 142 and cathode electrode 141 are noble metal particles.

Alternatively, the oxygen room 130 can be used to store fuel gas, the fuel room 1252 can be used to store oxygen gas, and the cathode electrode 141 and the anode electrode 142 can be exchanged, and the cathode electrode space 1244 and the anode electrode space 1242 can be exchanged.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A proton exchange membrane fuel cell, comprising:
   a reacting room;
   a fuel room in communication with the reacting room through a fuel inputting hole;
   a fuel inputting door located on the fuel inputting hole;
   a waste room in communication with the reacting room through a waste outputting hole;
   a waste outputting door located on the waste outputting hole; and
   a membrane electrode assembly device located in the reacting room, wherein the membrane electrode assembly device defines a bellows and a pipe connected to the bellows and extending out of the reacting room, the reacting room is divided into a first electrode space outside the bellows and a second electrode space inside the bellows, volumes of the first electrode space and the second electrode space can be changed by deforming the bellows.

2. The proton exchange membrane fuel cell of claim 1, wherein the membrane electrode assembly device comprises a hollow supporting structure and a membrane electrode assembly located on the hollow supporting structure.

3. The proton exchange membrane fuel cell of claim 2, wherein the hollow supporting structure defines the bellows and the pipe.

4. The proton exchange membrane fuel cell of claim 3, wherein the hollow supporting structure defines a plurality of first through holes on a first wall of the bellows; and the membrane electrode assembly covers the plurality of first through holes.

5. The proton exchange membrane fuel cell of claim 4, wherein the hollow supporting structure further defines a plurality of second through holes on a second wall of the pipe; and the membrane electrode assembly further covers the plurality of second through holes.

6. The proton exchange membrane fuel cell of claim 1, wherein the membrane electrode assembly device further comprises a gasket ring used to seal the first electrode space.

7. The proton exchange membrane fuel cell of claim 1, further comprising an oxygen room and a gas inputting door, wherein the oxygen room is in communication with the second electrode space through a gas inputting hole and the gas inputting door is located on the gas inputting hole.

8. The proton exchange membrane fuel cell of claim 7, further comprising a gas outputting door located on one end of the pipe that is outside of the reacting room, and the pipe is only used to exhaust waste gas.

9. The proton exchange membrane fuel cell of claim 1, wherein one end of the pipe extend to an outside atmosphere;
   when the bellows is expanded, the volumes of the first electrode space and the second electrode space increase, pressures of the first electrode space and the second electrode space decrease, the fuel inputting door is open and the outputting door is closed so that fuel in the fuel room enters the first electrode space from the fuel room, and air outside of the bellows enters the bellows through the pipe; and
   when the bellows is compressed, the volumes of the first electrode space and the second electrode space decrease, and pressures of the first electrode space and the second electrode space increase, the fuel inputting door is closed and the outputting door is open so that waste fuel in the first electrode space enters the waste room from the first electrode space, and waste gas inside of the bellows is exhausted through the pipe.

10. The proton exchange membrane fuel cell of claim 9, wherein the fuel inputting door is fixed on an inner surface of the reacting room, the fuel inputting door is closed when the pressure of the reacting room is higher than the pressure of the fuel room, and the fuel inputting door is open when the pressure of the reacting room is lower than the pressure of the fuel room; and the waste outputting door is fixed on an inner surface of the waste room, the waste outputting door is open when the pressure of the reacting room is higher than the pressure of the waste room, and the waste outputting door is closed when the pressure of the reacting room is lower than the pressure of the waste room.

11. The proton exchange membrane fuel cell of claim 1, wherein the reacting room has a bottom wall and a top wall defining a gas exchange hole, and the pipe pass through the gas exchange hole.

12. The proton exchange membrane fuel cell of claim 11, wherein a length of the pipe is greater than a distance between the bottom wall and the top wall.

13. The proton exchange membrane fuel cell of claim 1, wherein a cross section size of the bellows is less than a cross-section size of the reacting room, and a bellows top wall of the bellows and the reacting room have the same cross-section shapes and sizes so that the first electrode space is sealed by the bellows top wall.

14. The proton exchange membrane fuel cell of claim 6, wherein the gasket ring comprises an annular rubber body, and the annular body and the reacting room have the same cross section shapes and size.

15. The proton exchange membrane fuel cell of claim 7, wherein the gas inputting door is closed when the pressure of the second electrode space is higher than the pressure of the oxygen room, and the gas inputting door is open when the pressure of the cathode electrode space is lower than the pressure of the oxygen room.

16. The proton exchange membrane fuel cell of claim 8, wherein the end of the pipe extends to an outside atmosphere.

17. The proton exchange membrane fuel cell of claim 16, wherein the gas outputting door is open when the pressure of the second electrode space is higher than the pressure of the atmosphere, and the gas outputting door is closed when the pressure of the second electrode space is lower than the pressure of the atmosphere.

* * * * *